US009124542B2

(12) United States Patent
Low et al.

(10) Patent No.: US 9,124,542 B2
(45) Date of Patent: *Sep. 1, 2015

(54) MESSAGE PROCESSING SYSTEM

(71) Applicant: III Holdings 1, LLC, Wilmington, DE (US)

(72) Inventors: Sydney Gordon Low, Kew (AU); William Dennis Lang, Kew (AU)

(73) Assignee: III Holdings 1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,861

(22) Filed: Jul. 8, 2014

(65) Prior Publication Data

US 2014/0325003 A1 Oct. 30, 2014

Related U.S. Application Data

(63) Continuation of application No. 13/745,561, filed on Jan. 18, 2013, now abandoned, which is a continuation of application No. 10/009,575, filed as application No. PCT/AU00/00454 on May 12, 2000, now Pat. No. 8,359,289.

(51) Int. Cl.
*G06F 17/30* (2006.01)
*H04L 12/58* (2006.01)
*G06Q 10/10* (2012.01)

(52) U.S. Cl.
CPC .............. *H04L 51/12* (2013.01); *G06Q 10/107* (2013.01); *H04L 12/585* (2013.01); *G06F 17/30675* (2013.01); *H04L 12/587* (2013.01)

(58) Field of Classification Search
CPC .................. G06F 17/30675; H04L 12/587
USPC ............................ 707/608; 709/203, 204, 206
See application file for complete search history.

(56) References Cited

U.S. PATENT DOCUMENTS

| 4,928,145 A | 5/1990 | Okamoto |
| 4,932,826 A | 6/1990 | Moy et al. |
| 5,560,008 A | 9/1996 | Johnson et al. |
| 5,619,648 A | 4/1997 | Canale et al. |
| 5,696,898 A | 12/1997 | Baker et al. |
| 5,717,923 A | 2/1998 | Dedrick |
| 5,758,083 A | 5/1998 | Singh et al. |

(Continued)

FOREIGN PATENT DOCUMENTS

| EP | 0813162 A2 | 12/1997 |
| JP | 11068828 A2 | 3/1999 |

(Continued)

OTHER PUBLICATIONS

Cranor et al., "Spam!," Communications of the ACM, vol. 41, No. 8, pp. 74-83 (Aug. 1998).

(Continued)

*Primary Examiner* — Jean M Corrielus
(74) *Attorney, Agent, or Firm* — Volpe and Koenig, P.C.

(57) ABSTRACT

A message processing system, including an e-mail server for receiving and storing e-mails for a recipient, and an e-mail manager for processing e-mails for a recipient to determine if the e-mails are approved based on stored criteria, sending approved e-mails for the recipient to a location for access by the recipient, and storing and sending a notification to the recipient of unapproved messages.

18 Claims, 2 Drawing Sheets

(56) References Cited

U.S. PATENT DOCUMENTS

| | | | |
|---|---|---|---|
| 5,805,810 A * | 9/1998 | Maxwell | 709/206 |
| 5,819,092 A | 10/1998 | Ferguson et al. | |
| 5,826,022 A | 10/1998 | Nielsen | |
| 5,889,958 A | 3/1999 | Willens | |
| 5,905,777 A * | 5/1999 | Foladare et al. | 379/90.01 |
| 5,923,848 A * | 7/1999 | Goodhand et al. | 709/219 |
| 5,948,061 A | 9/1999 | Merriman et al. | |
| 5,958,005 A * | 9/1999 | Thorne et al. | 709/202 |
| 6,052,709 A | 4/2000 | Paul | |
| 6,076,101 A * | 6/2000 | Kamakura et al. | 709/206 |
| 6,108,688 A * | 8/2000 | Nielsen | 709/206 |
| 6,112,227 A * | 8/2000 | Heiner | 709/203 |
| 6,182,118 B1 * | 1/2001 | Finney et al. | 709/206 |
| 6,192,396 B1 * | 2/2001 | Kohler | 709/206 |
| 6,199,102 B1 | 3/2001 | Cobb | |
| 6,212,553 B1 * | 4/2001 | Lee et al. | 709/206 |
| 6,230,188 B1 | 5/2001 | Marcus | |
| 6,237,037 B1 | 5/2001 | Larsson | |
| 6,266,692 B1 | 7/2001 | Greenstein | |
| 6,275,850 B1 * | 8/2001 | Beyda et al. | 709/206 |
| 6,289,212 B1 * | 9/2001 | Stein et al. | 455/412.1 |
| 6,314,454 B1 * | 11/2001 | Wang et al. | 709/206 |
| 6,317,648 B1 | 11/2001 | Sleep et al. | |
| 6,321,267 B1 | 11/2001 | Donaldson | |
| 6,324,569 B1 | 11/2001 | Ogilvie et al. | |
| 6,335,963 B1 * | 1/2002 | Bosco | 379/88.12 |
| 6,345,281 B1 | 2/2002 | Kardos et al. | |
| 6,363,427 B1 | 3/2002 | Teibel et al. | |
| 6,366,950 B1 | 4/2002 | Scheussler et al. | |
| 6,377,978 B1 * | 4/2002 | Nguyen | 709/206 |
| 6,393,464 B1 | 5/2002 | Dieterman | |
| 6,421,709 B1 | 7/2002 | McCormick et al. | |
| 6,430,562 B1 | 8/2002 | Kardos et al. | |
| 6,460,050 B1 | 10/2002 | Pace et al. | |
| 6,480,855 B1 | 11/2002 | Siefert | |
| 6,480,885 B1 | 11/2002 | Olivier | |
| 6,487,586 B2 | 11/2002 | Ogilvie et al. | |
| 6,496,855 B1 | 12/2002 | Hunt et al. | |
| 6,522,945 B2 | 2/2003 | Sleep et al. | |
| 6,606,647 B2 * | 8/2003 | Shah et al. | 709/206 |
| 6,615,242 B1 | 9/2003 | Riemers | |
| 6,625,257 B1 | 9/2003 | Asaoka et al. | |
| 6,631,398 B1 | 10/2003 | Klein | |
| 6,701,347 B1 | 3/2004 | Ogilvie | |
| 6,711,608 B1 | 3/2004 | Ogilvie | |
| 6,757,813 B1 | 6/2004 | Igura | |
| 6,839,741 B1 * | 1/2005 | Tsai | 709/217 |
| 7,603,425 B2 | 10/2009 | DiPlacido et al. | |
| 7,647,381 B2 | 1/2010 | Logue et al. | |
| 7,680,890 B1 | 3/2010 | Lin | |
| 8,090,788 B2 | 1/2012 | Nachum | |
| 8,209,387 B2 | 6/2012 | Fleming, III | |
| 8,234,371 B2 | 7/2012 | Logue et al. | |
| 8,364,711 B2 | 1/2013 | Wilkins et al. | |
| 8,682,990 B2 | 3/2014 | Vitaldevara et al. | |
| 2002/0016824 A1 | 2/2002 | Leeds | |
| 2003/0023736 A1 | 1/2003 | Abkemeier | |
| 2003/0105821 A1 * | 6/2003 | Shah et al. | 709/206 |
| 2005/0021637 A1 | 1/2005 | Cox | |
| 2005/0053207 A1 | 3/2005 | Claudatos et al. | |
| 2005/0055409 A1 | 3/2005 | Alsarraf et al. | |
| 2005/0055415 A1 | 3/2005 | Alsarraf et al. | |
| 2005/0060643 A1 | 3/2005 | Glass et al. | |
| 2005/0198124 A1 | 9/2005 | McCarthy | |
| 2006/0036701 A1 | 2/2006 | Bulfer et al. | |
| 2006/0047518 A1 | 3/2006 | Claudatos et al. | |
| 2010/0312621 A1 | 12/2010 | Abdulhayoglu | |
| 2011/0264585 A1 | 10/2011 | Abdulhayoglu | |
| 2013/0086181 A1 | 4/2013 | Vitaldevara et al. | |

FOREIGN PATENT DOCUMENTS

| | | |
|---|---|---|
| JP | 3003640 A2 | 1/2000 |
| WO | 9642041 A2 | 12/1996 |
| WO | 9841913 A2 | 9/1998 |
| WO | 9857285 A1 | 12/1998 |
| WO | 9932985 A1 | 7/1999 |
| WO | 9937066 A1 | 7/1999 |
| WO | 9959375 A2 | 11/1999 |
| WO | 9967731 A1 | 12/1999 |
| WO | 0068862 A1 | 11/2000 |
| WO | 0213025 A1 | 2/2002 |

OTHER PUBLICATIONS

Dezen et al., "Value-Added Internet: A Pragmatic TINA-based Path to the Internet and PSTN Integration," IEEE, pp. 13-21 (Nov. 17-20, 1997).

Final Rejection, U.S. Appl. No. 10/009,575, issued Feb. 2, 2012.
Final Rejection, U.S. Appl. No. 10/009,575, issued Jun. 30, 2005.
Final Rejection, U.S. Appl. No. 10/009,575, issued Jan. 3, 2008.
Final Rejection, U.S. Appl. No. 10/009,575, issued May 19, 2006.
Hotmail Screen Shot (Sep. 1999).
Hotmail Screen Shot 1 (1996-1998).
Hotmail Screen Shot 2 (May 1999).
Hotmail Screen Shot 3 (1999).
Hotmail Screen Shot 4 (Pre-Dec. 1999).
International Examination Report, PCT Application PCT/AU00/00454, dated Apr. 26, 2001.
International Search Report, PCT Application PCT/AU00/00454, dated Jun. 27, 2000.
Katirai, "Filtering Junk E-Mail: A Performance Comparison between Genetic Programming & Naive Bayes," University of Waterloo (Sep. 10, 1999).
Non-Final Rejection, U.S. Appl. No. 10/009,575, issued Sep. 17, 2003.
Non-Final Rejection, U.S. Appl. No. 10/009,575, issued Jan. 4, 2005.
Non-Final Rejection, U.S. Appl. No. 10/009,575, issued Sep. 28, 2006.
Non-Final Rejection, U.S. Appl. No. 10/009,575, issued Mar. 13, 2007.
Non-Final Rejection, U.S. Appl. No. 10/009,575, issued Jul. 3, 2007.
Non-Final Rejection, U.S. Appl. No. 10/009,575, issued Jul. 23, 2012.
Non-Final Rejection, U.S. Appl. No. 13/745,561, issued Jun. 9, 2013.
Notice of Allowance, U.S. Appl. No. 10/009,575, issued Sep. 18, 2012.
Notice of Allowance, U.S. Appl. No. 13/745,561, issued Dec. 10, 2013.
Notice of Allowance, U.S. Appl. No. 13/745,561, issued Apr. 8, 2014.
Press Release 1 (Dec. 1, 1999).
Press Release 2 (Mar. 9, 2000).
Yoon, "Vicarious Certification and Billing Agent for Web Information Service," IEEE, pp. 344-349 (Jan. 21-23, 1998).

* cited by examiner

MESSAGE PROCESSING SYSTEM

CROSS-REFERENCE TO RELATED APPLICATIONS

The present application is a continuation of U.S. application Ser. No. 13/745,561, filed Jan. 18, 2013, now abandoned, which is a continuation of U.S. application Ser. No. 10/009,575, filed Aug. 6, 2002, which issued as U.S. Pat. No. 8,359,289 on Jan. 22, 2013, which is the U.S. National Phase of International Application No. PCT/AU00/00454, filed May 12, 2000, which claims the benefit of Australian Provisional Patent Application No. PQ 0302, filed May 12, 1999, all of which are incorporated by reference in their entirety.

BACKGROUND OF THE INVENTION

1. Field of the Invention

The present invention relates to a message handling process and a message processing system, which may be used to deal with unsolicited and unapproved electronic messages.

2. Description of the Related Art

Electronic messaging, particularly the use of e-mail over the Internet, has been enthusiastically adopted by large numbers of people, who have taken advantage of the inherent efficiencies and convenience of electronic messaging. One unfortunate consequence of Internet e-mail, however, has been the proliferation of unsolicited and unwanted e-mail messages, often referred to as "spam", which people receive. Various methods have been developed to restrict or prevent spam from reaching intended recipients. The methods have included both technical and legal measures which to date have met with mixed results. None have eliminated the problem of spam, nor prevented "spammers" from sending their messages and seeking to subvert the measures.

One of the technical measures includes applying a spam filter which processes an incoming message to determine whether it should forwarded to the recipient or not. The disadvantage associated with such filters is that inevitably useful messages for the recipient are inadvertently filtered and never received.

It is desired to provide a method and system which provides a useful alternative or which allows management of unsolicited messages without seeking to simply restrict or filter incoming messages.

SUMMARY OF THE INVENTION

The present invention relates to a message handling process, including:
determining if a message is approved for the recipient of the message;
processing the message for subsequent viewing by the recipient if the message is approved; and
notifying the recipient and storing the message if the message is unapproved.

The present invention also provides a message processing system, including:
means for determining if a message is approved for the recipient of the message;
means for processing the message for subsequent viewing by the recipient if the message is approved; and
means for notifying the recipient and storing the message if the message is unapproved.

The present invention also provides a message processing system, including:
an electronic message server for receiving and storing electronic messages for a recipient; and
an electronic message manager for processing electronic messages for a recipient to determine if the electronic messages are approved based on stored criteria, sending approved electronic messages for the recipient to a location for access by the recipient, and storing and sending a notification to the recipient of unapproved messages.

BRIEF DESCRIPTION OF THE DRAWINGS

A preferred embodiment of the present invention is hereinafter described, by way of example only, with reference to the accompanying drawings, wherein.

DETAILED DESCRIPTION OF THE PREFERRED EMBODIMENT

Figure 1:
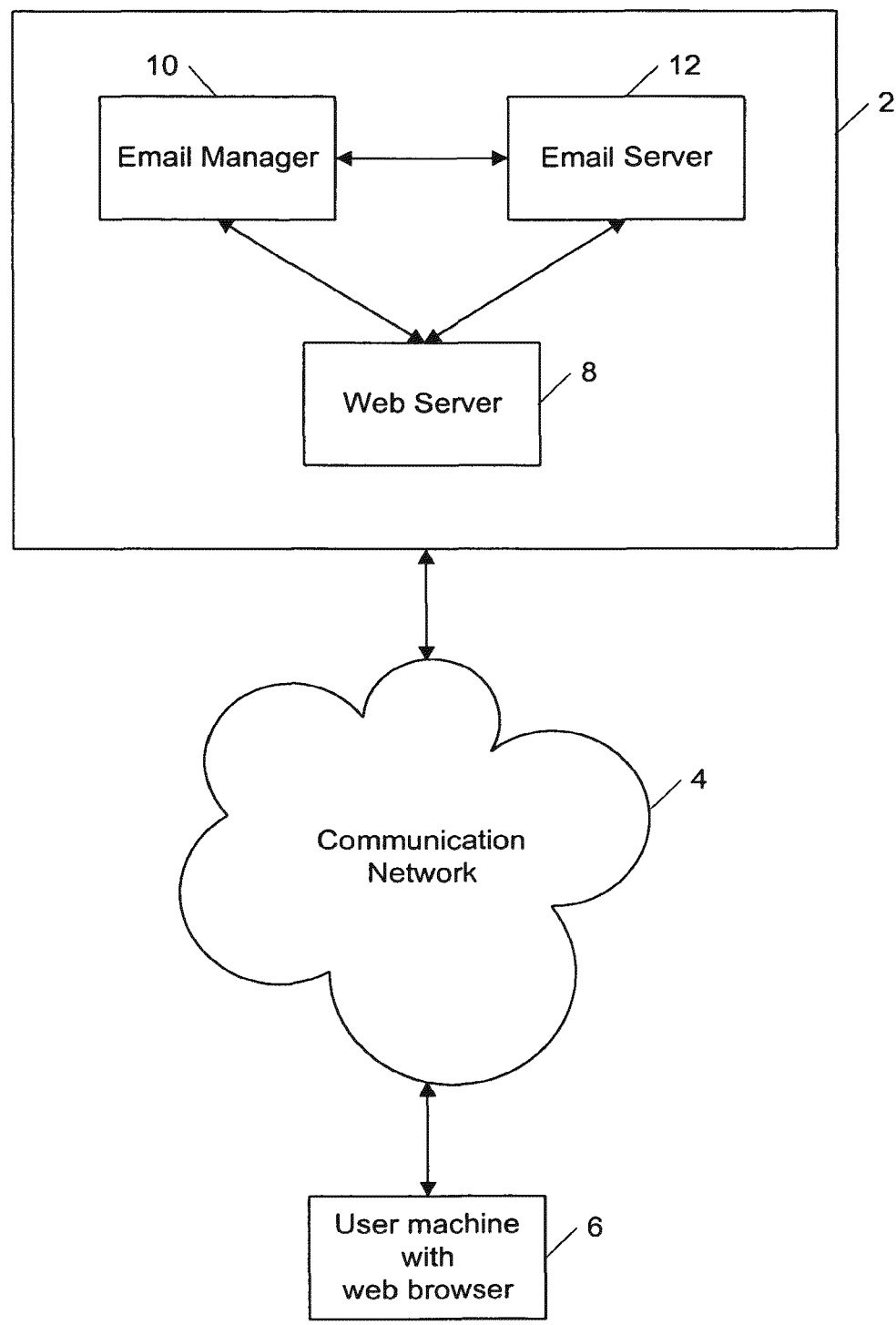
FIG. 1 is a block diagram of a preferred embodiment of a message processing system connected to a communications network.

A message processing system 2, as shown in FIG. 1, is provided by a computer which may be a Unix server. The system 2 includes standard web server 8 and e-mail server 12 so that the system 2 can operate as a web server and can also operate as an e-mail server, i.e. a standard POP3/SMTP/IMAP e-mail server. The system 2 also includes e-mail manager 10 stored on the server which includes program code and database code that establishes a database on the system 2. The code of the email manager 10 causes the system 2 to execute the message handling steps described below. Although shown on one machine, it will be understood by those skilled in the art that components 8, 10 and 12 of the system 2 can be distributed amongst a number of machines in different locations, provided the components 8, 10 and 12 can communicate with one another, as shown in FIG. 1. Also it will be understood that the e-mail manager could be provided at least in part by application specific integrated circuits (ASICs) which execute the steps of the message handling process.

A user of the system 2 is able to access the system 2 via a communications network 4 using a standard computer 6 with a web browser. The communications network 4 may be, for example, the Internet or a LAN. For instance, the system 2 may be part of a corporate intranet, and act as a gateway for the intranet to the Internet. The system 2 may also be controlled by a service provider simply providing an e-mail service via the Internet. The service provider can then service any users which can connect via the Internet, including the users of corporate networks. Users, including companies, which use the system are registered and identified as being users by the e-mail manager 10. All e-mails for the users are then directed to the system 2.

Figure 2:
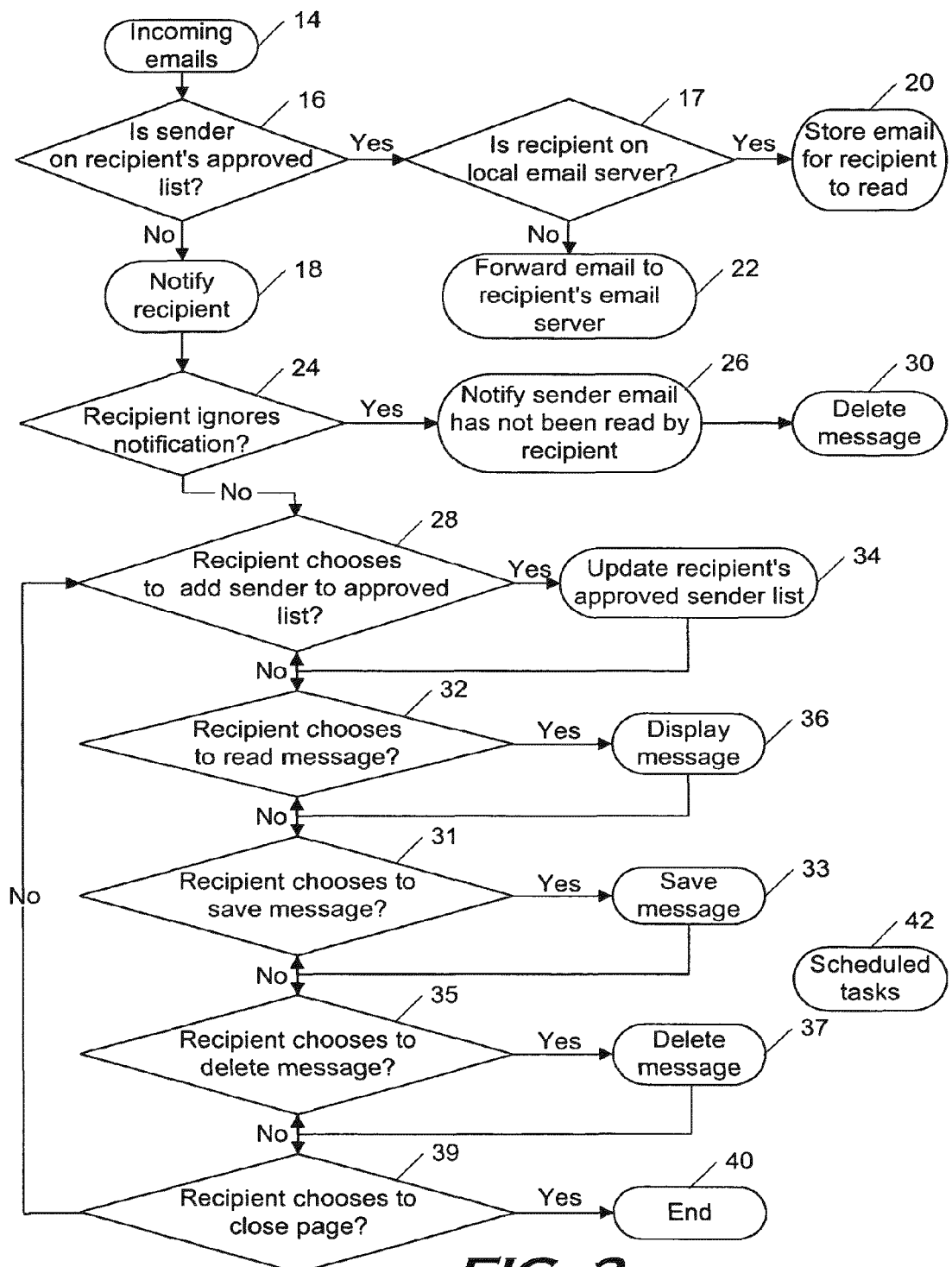
FIG. 2 is a flow diagram of the message handling process executed by the message processing system.

The message handling method executed by the system 2, and in particular the e-mail manager 10, is shown in FIG. 2. For incoming e-mails received by the system 2 for the users, at step 14, the e-mail manager 10 determines, at step 16, whether the e-mail message is approved. Approval of an e-mail message can be based on a number of criteria, with the simplest being whether the sender of the message is on a list of approved senders for the intended recipient that is stored on the database of the e-mail manager 10. If the message is approved at step 16, a forward procedure is executed and a determination is made at step 17 as to whether the recipient collects e-mail messages from the e-mail server 12 directly. If so, the message is stored on the e-mail server 12 at step 20 for retrieval from the e-mail server 12 in the normal manner. Otherwise the e-mail server 12 forwards the message to the recipient's e-mail server at step 22 via the communications network 4.

If it is determined at step 16 that the message is not approved, then the system 2 notifies the recipient, at step 18, that it has disallowed a received message for the recipient. The recipient can be notified by a number of communications methods, such as by e-mail or by a telephone call over the network 4. On receipt of the notification at step 18, the recipient can direct their web browser to the web server 8 and view a list of disallowed messages. From the list, the user can execute a number of actions, such as read the message, select a sender of a message to be added to the approved list stored by the e-mail manager 10 or simply delete messages.

At step 18, the sender of an e-mail that has been disallowed by the system 2 is notified by e-mail that their message has been held in a pending mailbox because they were not on the recipient's list of authorised e-mail senders. The sender is also informed by e-mail that if they wish to ensure that the recipient reads the e-mail, the sender should use other means, such as telephone, to inform the recipient that they have been sent an e-mail and ask that the recipient add the sender's e-mail address to the recipient's list of authorised senders.

The e-mail manager 10 uses the e-mail server 12 to send the notifications at step 18 by e-mail, and the e-mail for the recipient includes a URL for the web server 8. A recipient can then respond to the notification by selecting the URL and pointing the browser to the web server 8. The e-mail manager 10 determines at step 24, after a predetermined period of time, whether or not the recipient has ignored the notification sent by e-mail. If the notification is ignored, the system 2 sends a return e-mail, at step 26, notifying the sender that the sent message has not been the read by the recipient. The message is then deleted at step 30.

If the recipient responds to the e-mail notification so as to direct the recipient's browser to the system 2, the browser communicates with the web server 8 which sends a web page, designated by the URL. The web page displays a list of messages not approved by the e-mail manager 10 with the recently sent message being highlighted or selected. The e-mail manager 10 then enters a loop which allows a number of functions to be executed. At step 28 the e-mail manager 10 determines whether the recipient has selected on the web page an option to add the sender of the highlighted message to the approved list maintained by the e-mail manager 10. If not, operation of the e-mail manager 10 proceeds to step 32, otherwise the e-mail manager 10 will update the recipient's approved list to add the sender, at step 34, and then proceed to step 32. At step 32, the e-mail manager 10 determines whether the recipient has chosen an option on the web page to read the highlighted message, and if not, operation proceeds to step 31. Otherwise, the message is displayed at step 36 for the recipient's browser, and operation proceeds to step 31. At step 31, the manager determines whether the recipient has selected an option on the web page to save the highlighted or read message, and if so, operation proceeds to step 33 to save the message. At step 33, the forward procedure is called to execute step 17 for the message and proceed to either step 20 or 22 to save the message and then return to the loop. At step 35, the e-mail manager 10 determines whether the recipient has selected an option to delete the highlighted or read message. If so, the message is deleted at step 37, and operation returns to the loop. At step 39, a determination is made, based on activity of the recipient, as to whether the recipient has directed its browser away from or closed the web page, and if so, the loop is exited and operation ends at step 40.

The e-mail manager 10 also executes scheduled tasks 42 to delete unapproved messages on which no action has been taken by recipients for a predetermined period of time, and notify senders as in step 26. Alternatively, the scheduled tasks may be set for a recipient so that unapproved messages on which no action has been taken for a predetermined period of time are stored or saved automatically by calling the forward procedure to execute step 17 and proceed to either step 20 or 22.

The above system 2 and management method are particularly advantageous as they provide users with the capability to manage unsolicited or unapproved e-mail messages without having the messages inadvertently removed by a message filter. The management facilities provided by the system 2 are web browser based, and provides significant additional management services to users of browser based e-mail services, such as those provided by Hotmail and Yahoo.

Many modifications will be apparent to those skilled in the art without departing from the scope of the present invention as herein described with reference to the accompanying drawings.

What is claimed is:

1. A method performed by a server, the method comprising:
   forwarding, by a processor of the server, an electronic message when determined by the server that the electronic message is approved to forward to a recipient;
   storing, by the server, the electronic message with an indication when the electronic message is unapproved;
   sending, via a network to a client device of the recipient by the server, a message that the electronic message is unapproved, wherein the message includes a URL to view the unapproved electronic message in a web browser; and
   sending, to the client device by the server in the message, a list of unapproved electronic messages to display in the web browser,
   wherein the list includes selectable options to send the unapproved electronic message by the server, to have the server add a sender of the unapproved electronic message to an approved sender list, and to have the server delete the unapproved electronic message.

2. The method of claim 1 further comprising: sending, by the server, a notification message with a link to network data having the list of unapproved electronic messages.

3. The method of claim 1, wherein the server provides the client device a criteria to determine whether the electronic message is approved.

4. The method of claim 3, wherein the criteria comprises the approved sender list.

5. The method of claim 1, wherein the server deletes unapproved electronic messages after a predetermined period.

6. The method of claim 1, wherein the server saves unapproved electronic messages after a predetermined period of time by using a forwarding procedure.

7. The method of claim 1, wherein the unapproved electronic message is unread.

8. The method of claim 1 further comprising: notifying, by the server, a sender of deletion of the unapproved electronic message.

9. The method of claim 1, wherein the list of unapproved electronic messages does not include a self-removing message indicator.

10. A server comprising:
    a processor, of the server, configured to forward an electronic message when determined by the server that the electronic message is approved to forward to a recipient;

circuitry configured to store the electronic message with an indication when the electronic message is unapproved;

circuitry configured to send, via a network to a client device of the recipient, a message that the electronic message is unapproved, wherein the message includes a URL to view the unapproved electronic message in a web browser; and circuitry configured to send, to the client device in the message, a list of unapproved electronic messages to display in the web browser, wherein the list includes selectable options to send the unapproved electronic message by the server, to have the server add a sender of the unapproved electronic message to an approved sender list, and to have the server delete the unapproved electronic message.

11. The server of claim 10 further comprising: circuitry configured to send a notification message with a link to network data having the list of unapproved electronic messages.

12. The server of claim 10, wherein the server provides the client device a criteria to determine whether the electronic message is approved.

13. The server of claim 12, wherein the criteria comprises the approved sender list.

14. The server of claim 10, wherein the server deletes unapproved electronic messages after a predetermined period.

15. The server of claim 10, wherein the server saves unapproved electronic messages after a predetermined period of time with utilization of a forwarding procedure.

16. The server of claim 10, wherein the unapproved electronic message is unread.

17. The server of claim 10 further comprising: circuitry configured to notify a sender of deletion of the unapproved electronic message.

18. The server of claim 10, wherein the list of unapproved electronic messages does not include a self-removing message indicator.

* * * * *